US007003460B1

(12) United States Patent
Bub et al.

(10) Patent No.: US 7,003,460 B1
(45) Date of Patent: Feb. 21, 2006

(54) METHOD AND APPARATUS FOR AN ADAPTIVE SPEECH RECOGNITION SYSTEM UTILIZING HMM MODELS

(75) Inventors: Udo Bub, München (DE); Harald Höge, Gauting (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/700,143

(22) PCT Filed: May 3, 1999

(86) PCT No.: PCT/DE99/01323

§ 371 (c)(1), (2), (4) Date: Nov. 9, 2000

(87) PCT Pub. No.: WO99/59135

PCT Pub. Date: Nov. 18, 1999

(30) Foreign Application Priority Data

May 11, 1998 (DE) ................................ 198 21 057

(51) Int. Cl.
*G10L 15/14* (2006.01)

(52) U.S. Cl. ....................... 704/256; 704/240; 704/255

(58) Field of Classification Search ................ 704/256, 704/240, 242, 255

See application file for complete search history.

(56) References Cited

U.S. PATENT DOCUMENTS

| | | | | |
|---|---|---|---|---|
| 5,129,002 | A | 7/1992 | Tsuboka | |
| 5,321,636 | A | 6/1994 | Beerends | |
| 5,794,197 | A * | 8/1998 | Alleva et al. | 704/255 |
| 5,825,978 | A * | 10/1998 | Digalakis et al. | 704/256 |
| 5,839,105 | A | 11/1998 | Ostendorf et al. | |
| 6,141,641 | A * | 10/2000 | Hwang et al. | 704/243 |
| 6,460,017 | B1 * | 10/2002 | Bub et al. | 704/256 |
| 6,501,833 | B1 * | 12/2002 | Phillips et al. | 704/244 |

FOREIGN PATENT DOCUMENTS

| | | | |
|---|---|---|---|
| JP | 9-152886 | | 6/1997 |
| WO | WO 98/11534 | * | 9/1996 |

OTHER PUBLICATIONS

A real time speaker independent continuous speech recognition system, Iwasaki, et al.□□ IEEE-ICASSP '92.*

A success state splitting algorithm for efficient allophone modelling, Takami, et al. □□IEEE-ICASSP'92*

* cited by examiner

*Primary Examiner*—Susan McFadden
*Assistant Examiner*—Huyen X. Vo
(74) *Attorney, Agent, or Firm*—Bell Boyd & Lloyd LLC

(57) ABSTRACT

In speech recognition, phonemes of a language are modelled by a hidden Markov model, whereby each status of the hidden Markov model is described by a probability density function. For speech recognition of a modified vocabulary, the probability density function is split into a first and into a second probability density function. As a result thereof, it is possible to compensate variations in the speaking habits of a speaker or to add a new word to the vocabulary of the speech recognition unit and thereby assure that this new word is distinguished with adequate quality from the words already present in the speech recognition unit and is thus recognized.

8 Claims, 1 Drawing Sheet

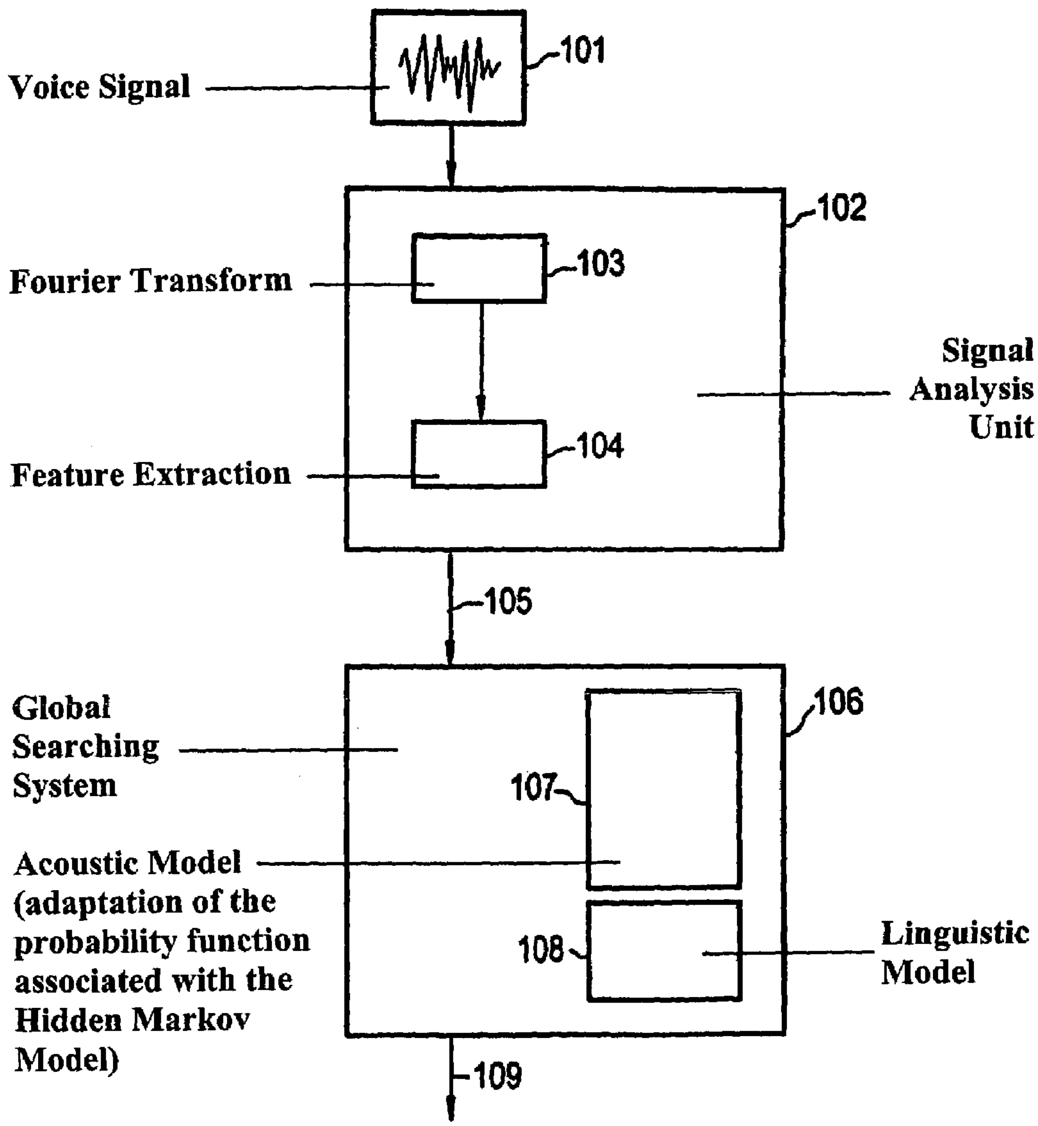
Voice Signal
101
102
Fourier Transform
103
Signal Analysis Unit
Feature Extraction
104
105
Global Searching System
106
107
Acoustic Model (adaptation of the probability function associated with the Hidden Markov Model)
108
Linguistic Model
109

METHOD AND APPARATUS FOR AN ADAPTIVE SPEECH RECOGNITION SYSTEM UTILIZING HMM MODELS

BACKGROUND OF THE INVENTION

1. Field of the Invention

The invention is directed to an arrangement and a method for the recognition of a predetermined vocabulary in spoken language by a computer.

2. Description of the Prior Art

A method and an arrangement for the recognition of spoken language are known from "Sprachunterricht—Wie funktionert die computerbasierte Spracherkennung?", Haberland et al., c't—Magazin für Computerechnik—, Vol. 5, 1998, pp 120–125. Particularly until a recognized word sequence is obtained from a digitalized voice signal, a signal analysis and a global search that accesses an acoustic model and a linguistic model of the language to be recognized are implemented in the recognition of spoken language. The acoustic model is based on a phoneme inventory realized with the assistance of hidden Markov models (HMMs). With the assistance of the acoustic model, a suitable probable word sequences is determined during the global search for feature vectors that proceeded from the signal analysis and this is output as recognized word sequence. The words to be recognized are stored in a pronunciation lexicon together with a phonetic transcription. The relationship is explained in depth in the aforementioned Haberland et al. article.

For explaining the subsequent comments, the terms that are employed shall be briefly discussed here.

As phase of the computer-based speech recognition, the signal analysis includes a Fourier transformation of the digitalized voice signal and a feature extraction following thereupon. It proceeds from the aforementioned Haberland et al. article that the signal analysis ensues every ten milliseconds. From overlapping time segments with a respective duration of, for example, 25 milliseconds, approximately 30 features are determined on the basis of the signal analysis and combined to form as feature vector. The components of the feature vector describe the spectral energy distribution of the appertaining signal excerpt. In order to arrive at this energy distribution, a Fourier transformation is implemented on every signal excerpt (25 ms time excerpt). The components of the feature vector result from the presentation of the signal in the frequency domain. After the signal analysis, thus, the digitalized voice signal is present in the form of feature vectors.

These feature vectors are supplied to the global search, a further phase of the speech recognition. As already mentioned, the global search makes use of the acoustic model and, potentially, of the linguistic model in order to image the sequence of feature vectors onto individual parts of the language (vocabulary) present as model. A language is composed of a given plurality of sounds, referred to as phonemes, whose totality is referred to as phoneme inventory. The vocabulary is modelled by phoneme sequences and stored in a pronunciation lexicon. Each phoneme is modelled by at least one HMM. A plurality of HMMs yield a stochastic automaton that comprises statusses and status transitions. The time execution of the occurrence of specific feature vectors (even within a phoneme) can be modelled with HMMs. A corresponding phoneme model thereby comprises a given plurality of statusses that are arranged in linear succession. A status of an HMM represents a part of a phoneme (for example an excerpt of 10 ms length). Each status is linked to an emission probability, which, in particular, is distributed according to Gauss, for the feature vectors and to transition probabilities for the possible transitions. A probability with which a feature vector is observed in an appertaining status is allocated to the feature vector with the emission distribution. The possible transitions are a direct transition from one status into a next status, a repetition of the status and a skipping of the status.

A joining of the HMM statusses to the appertaining transitions over the time is referred to as trellis. The principle of dynamic programming is employed in order to determined the acoustic probability of a word: the path through the trellis is sought that exhibits the fewest errors or, respectively, that is defined by the highest probability for a word to be recognized.

The result of the global search is the output or, respectively, offering of a recognized word sequence that derives taking the acoustic model (phoneme inventory) for each individual word and the language model for the sequence of words into consideration.

The article "Speaker Adaptation Based on MAP Estimation of HMM Parameters," Lee et al., Proc. IEEE Intern. Conf. on Acoustics, Speech and Signal Processing, pp II-588 through II-561 discloses a method for speaker adaptation based on a MAP estimate (MAP=maximum a posteriori) of HMM parameters.

According to this Lee et al. article, it is recognized that a speaker-dependent system for speech recognition normally supplies better results than a speaker-independent system, insofar as adequate training data are available that enable a modelling of the speaker-dependent system. However, the speaker-independent system achieves the better results as soon as the set of speaker-specific training data is limited. One possibility for performance enhancement of both systems, i.e. of both the speaker-dependent as well as the speaker-independent system for speech recognition, is comprised in employing previously stored datasets of a plurality of speakers such that a small set of training data also suffices for modelling a new speaker with adequate quality. Such a training method is called speaker adaptation. In [2], the speaker adaptation is particularly implemented by a MAP estimate of the hidden Markov model parameters.

Results of a method for recognizing spoken language generally deteriorate as soon as characteristic features of the spoken language deviate from characteristic features of the training data. Examples of characteristic features are speaker qualities or acoustic features that influence the articulation of the phonemes in the form of slurring.

The approach disclosed in the Lee et al. article for speaker adaptation employs "post-estimating" parameter values of the hidden Markov models, whereby this processing in implemented "offline", i.e. not at the run time of the method for speech recognition.

J. Takami et al., "Successive State Splitting Algorithm for Efficient Allophone Modeling", ICASSP 1992, March 1992, pages 573 through 576, San Francisco, USA, discloses a method for recognizing a predetermined vocabulary in spoken language wherein states are split in a hidden Markov model. The probability density function of the respective states is also split therefor.

SUMMARY OF THE INVENTION

An object of the invention is to provide an arrangement and a method for recognizing a predetermined vocabulary in spoken language, whereby, in particular, an adaptation of the acoustic model is accomplished within the run time (i.e., "online").

For achieving the object, in the inventive method for recognizing a predetermined vocabulary in spoken language with a computer, a voice signal is determined from the spoken language. The voice signal is subjected to a signal analysis from which feature vectors for describing the digitalized voice signal proceed. A global search is implemented for imaging the feature vectors onto a language present in modelled form, whereby each phoneme of the language is described by a modified hidden Markov model and each status of the modified hidden Markov model is described by a probability density function. An adaptation of the probability density function ensues such that it is split into a first probability density function and into a second probability density function. Finally, the global search offers a word sequence.

It should be noted that the probability density function that is split into a first and into a second probability density function can represent an emission distribution for a predetermined status of the modified hidden Markov model, whereby this emission distribution can also contain a superimposition of a plurality of probability density functions, for example Gauss curves (Gaussian probability density distributions.

A recognized word sequence can thereby also comprise individual sounds or, respectively, only a single word.

If, in the framework of the global search, a recognition is affected with a high value for the distance between spoken language and appertaining word sequence determined by the global search, then the allocation of a zero word can ensue, said zero word indicating that the spoken language is not being recognized with adequate quality.

By splitting the probability density function, one advantage of the invention is to create new regions in a feature space erected by the feature vectors, these new regions comprising significant information with reference to the digitalized voice data to be recognized and, thus, assuring an improved recognition.

In an embodiment of the invention the probability density function is split into the first and into the second probability density function when the drop off of an entropy value lies below a predetermined threshold.

The splitting of the probability density function dependent on an entropy value proves extremely advantageous in practice.

The entropy is generally a measure of an uncertainty in a prediction of a statistical event. In particular, the entropy can be mathematically defined for Gaussian distributions, whereby there is a direct logarithmic dependency between the scatter $\sigma$ and the enthropy.

In another embodiment of the invention probability density functions, particularly the first and the second probability density function respectively comprise at least one Gaussian distribution.

The probability density function of the status is approximated by a sum of a plurality of Gaussian distributions. The individual Gaussian distributions are called modes. In the recited method, in particular, the modes are considered isolated from one another. One mode is divided into two modes in every individual split event. When the probability density function was formed of m modes, then it is formed of M+1 modes after the split event. When, for example, a mode is assumed to be a Gaussian distribution, then an entropy can be calculated, as shown in the exemplary embodiment.

An online adaptation is advantageous because the method continues to recognize speech without having to be set to the modification of the vocabulary in a separate training phase. A self-adaptation ensues that, in particular, becomes necessary due to a modified co-articulation of the speakers due to an addition of a new word.

The online adaptation, accordingly, requires no separate calculation of the probability density functions that would in turn be responsible for a non-availability of the system for speech recognition.

In a further embodiment the invention identical standard deviations are defined for the first probability density function and for the second probability density function. A first average of the first probability density function and a second average of the second probability density function are defined such that the first average differs from the second average.

This is an example for the weighting of the first and second probability density function split from the probability density function. Arbitrarily other weightings are also conceivable that are to be adapted to the respective application.

In a further embodiment the method is multiply implemented in succession and, thus, a repeated splitting of the probability density function ensues.

The aforementioned object is also achieve in accordance with the invention in an arrangement with a processor unit that is configured such that the following steps can be implemented:

a) a digitalized voice signal is determined from the spoken language;
b) a signal analysis ensues on the digitalized voice signal, feature vectors for describing the digitalized voice signal proceeding therefrom;
c) a global search ensues for imaging the feature vectors onto a language present in modelled form, whereby each phoneme of the language can be described by a modified hidden Markov model and each status of the hidden Markov model can be described by a probability density function;
d) the probability density function is adapted by modification of the vocabulary in that the probability density function is split into a first probability density function and into a second probability density function; and
e) the global search offers a recognized word sequence This arrangement is especially suited for the implementation of the invention method or of one of its developments explained above.

DESCRIPTION OF THE DRAWING

The single FIGURE is a schematic block diagram illustrating the inventive arrangement for recognizing spoken language, which implements the inventive method for recognizing spoken language.

DESCRIPTION OF THE PREFERRED EMBODIMENTS

The figure illustrates the basic components of an inventive arrangement, for implementing the inventive method for the recognition of spoken language. The introduction to the specification is referenced for explaining the terms employed below.

In a signal analysis unit 102, a digitalized voice signal 101 is subjected to a Fourier transformation 103 with following feature extraction 104. The feature vectors 105 are communicated to a system for global searching 106. The global search 106 considers both an acoustic model 107 as well as a linguistic model 108 for determining the recognized word sequence 109. Accordingly, the digitalized voice signal 101 becomes the recognized word sequence 109.

The phoneme inventory is simulated in the acoustic model 107 on the basis of hidden Markov models.

A probability density function of a status of the hidden Markov model is approximated by a summing-up of individual Gaussian modes. A mode is, in particular, a Gaussian bell. A mixing of individual Gaussian bells and, thus, a modelling of the emission probability density function arises by summing up a plurality of modes. A decision is made on the basis of a statistical criterion as to whether the vocabulary of the speech recognition unit to be recognized can be modelled better by adding further modes. In the present invention, this is particularly achieved by incremental splitting of already existing modes when the statistical criterion is met.

The entropy is defined by $$H_p = -\int_{-\infty}^{\infty} p(\bar{x})\log_2 p(\bar{x})d\bar{x} \tag{1}$$

given the assumption that $p(\bar{x})$ is a Gaussian distribution with a diagonal covariance matrix, i.e.

$$p(\bar{x}) = \mathcal{N}(\bar{\mu}, \sigma_n) = \frac{1}{\sqrt{(2\pi)^N}}\frac{1}{\Pi_n \sigma_n}\cdot\exp\left(-\frac{1}{2}\sum_n \frac{(x_n-\mu_n)^2}{\sigma_n^2}\right) \tag{2}$$

one obtains $$H_p = \sum_{n=1}^{N} \log_2\sqrt{2\pi e}\,\sigma_n, \tag{3}$$

whereby $\mu$ references the anticipated value, $\sigma_n$ references the scatter for each component n, and N references the dimension of the feature space.

The true distribution $p(\bar{x})$ is not known. It is, in particular, assumed to be a Gaussian distribution. In the acoustic model, the probability $p(\bar{x})$ is approximated with $$\hat{p}(\bar{x}) = \mathcal{N}(\bar{\mu}, \sigma_n),$$

on the basis of random samples, whereby $$\bar{\mu} = \frac{1}{L}\sum_{l=1}^{L}\bar{x}_l$$

represents an average over L observations. The corresponding entropy as function of $\hat{\mu}$ is established by $$H_{\hat{p}}(\hat{\mu}) = -\int_{-\infty}^{\infty} p(\bar{x})\log_2\hat{p}(\bar{x})d\bar{x}, \tag{4}$$

which ultimately leads to $$H_{\hat{p}}(\hat{\mu}) = H_p + \sum_{n=1}^{N}\frac{(\mu_n-\hat{\mu}_n)^2}{\sigma_n^2}\log_2\sqrt{e} \tag{5}$$

The anticipated value $E\{(\mu_n-\hat{\mu}_n)^2\}$ amounts to $$\frac{1}{L}\sigma_n^2,$$

so that the anticipated value of $H\hat{p}(\hat{\mu})$ is given as $$H_{\hat{p}} = E\{H_{\hat{p}}(\hat{\mu})\} = H_p + \frac{N}{L}\log_2\sqrt{e}. \tag{6}$$

Equation (3) thus derives for the entropy of a mode that is defined with a Gaussian distribution with a diagonal covariance matrix. The process is now approximated with an estimating. The entropy of the approximated process derives as $$\hat{H} = H + \frac{N}{L}\log_2\sqrt{e}. \tag{7}$$

The estimate is all the better the higher the number L of random samples is, and the estimated entropy $\hat{H}$ becomes all the closer to the true entropy H.

Let $$p(\bar{x}) = \mathcal{N}(\bar{\mu}, \sigma_n) \tag{8}$$

be the mode to be divided. It is also assumed that the two Gaussian distributions that arise as a result of the division process have identical standard deviations $\sigma^s$ and are identically weighted. This yields $$\hat{p}^s(\bar{x}) = \frac{1}{2}\mathcal{N}(\bar{\hat{\mu}}_1^s, \sigma^s) + \frac{1}{2}\mathcal{N}(\bar{\hat{\mu}}_2^s, \sigma^s). \tag{9}$$

Given the assumption that $\mu_1 \approx \hat{\mu}_1$, $\mu_2 \approx \hat{\mu}_1$ and that $\mu_1$ is at a sufficiently great distance from $\mu_2$ the entropy of the split probability density function respectively derives as $$\hat{H}^s = 1 - \sum_{n=1}^{N}\log_2\sqrt{2\pi e}\,\sigma_n^s + \frac{1}{2}\left(\log_2\sqrt{e}\frac{N}{L_1} + \log_2\sqrt{e}\frac{N}{L_2}\right). \tag{10}$$

As division criterion, a reduction of the entropy as a result of the split event is required, i.e.

$$\hat{H} - \hat{H}^s > c \tag{11}$$

whereby C (with C>0) is a constant that represents the desired drop of the entropy. When $$\frac{L}{2} = L_1 = L_2 \tag{12}$$

is assumed, then deriving as a result thereof is $$\sum_{n=1}^{N} \log_2 \frac{\sigma_n}{\sigma_n^s} > \log_2 \sqrt{e} \frac{N}{L} + 1 + C. \tag{13}$$

One possibility of determining the mid-points of the two new modes is disclosed below. A preferred default is meeting the criterion for the splitting. In the recited example, the value of $\hat{\mu}$ allocated to $\hat{\mu}_1^s \cdot \hat{\mu}_2^s$ receives a maximum likelihood estimate of those observations that are imaged onto $\hat{\mu}$ in the Viterbi path. These stipulations merely reveal one possibility without any intent of a limitation of the disclosed method to this possibility. The following steps of the exemplary application shows the embedding into an arrangement for speech recognition or, respectively, a method for speech recognition.

Step 1: Initialization: $\bar{\mu}_1^s = \bar{\mu}$, $\bar{\mu}_2^s = \bar{\mu}$.

Step 2: Recognizing the expression, analyzing the Viterbi path;

Step 3: For every status and for every mode of the Viterbi path:

Step 3.1: define $\sigma_n$;

Step 3.2: define $L_2$ on the basis of those observations that lie closer to $\bar{\mu}_2^s$ than to $\bar{\mu}_1^s$ and set $L=L_2$. If $\bar{\mu}_2^s$ and $\bar{\mu}_1^s$ are identical, then assign the second half to the feature vectors $\bar{\mu}_2^s$ and the first half to the feature vectors $\bar{\mu}_1^s$.

Step 3.3: correspondingly define $\sigma_n^s$ on the basis of the $L_2$ expressions;

Step 3.4: Re-determine $\bar{\mu}_2^s$ on the basis of the average of those observations that lie closer to $\bar{\mu}_2^s$ than to $\bar{\mu}_1^s$.

Step 3.5: interpret division criterion according to Equation (13);

Step 3.6: if division criterion according to Equation (13) is positive, generate two new modes with the centers $\bar{\mu}^{1s}$ and $\bar{\mu}_2^s$.

Step 4: Go to step 2.

Although modifications and changes may be suggested by those skilled in the art, it is the intention of the inventors to embody within the patent warranted hereon all changes and modifications as reasonably and properly come within the scope of their contribution to the art.

What is claimed is:

1. A method for recognizing a predetermined vocabulary in a spoken language with a computer, comprising the steps of:

(a) determining a digitalized voice signal from the spoken language;

(b) conducting a signal analysis on the digitalized voice signal to obtain feature vectors for describing the digitalized voice signal;

(c) conducting a global search for imaging the feature vectors onto a language in model form, wherein each phoneme of the language is described by a modified hidden Markov model and each status of the hidden Markov model is described by a probability density function;

(d) adapting the probability density function by modifying the vocabulary by splitting the probability density function into a first probability density function and into a second probability density function if a drop of an entropy value is below a predetermined threshold, wherein the adaptation is dynamically performed at run time; and (e) producing a recognized word sequence based on steps a–d.

2. A method according to claim 1, comprising modifying the vocabulary by addition of a word to the vocabulary.

3. A method according to claim 1, wherein the first probability density function and the second probability density function respectively comprised at least one Gaussian distribution.

4. A method according to claim 3, comprising determining identical standard deviations, a first average of the first probability density function and a second average of the second probability density function for the first probability density function and for the second probability density function, whereby the first average differs from the second average.

5. A method according to claim 1, having an execution time associated therewith, and wherein the step of modifying the vocabulary is completed within the execution time.

6. A method according to claim 1, comprising modifying the vocabulary according to pronunciation habits of a speaker of the language.

7. A method according to claim 1, comprising splitting the probability density function multiple times.

8. Arrangement for recognizing a predetermined vocabulary in a spoken language comprising a processor unit that is configured to:

(a) determine a digitalized voice signal from the spoken language;

(b) conduct a signal analysis on the digitalized voice signal, to obtain feature vectors for describing the digitalized voice signal;

(c) conduct a global search for imaging the feature vectors onto a language present in modeled form, wherein each phoneme of the language is described by a modified hidden Markov model and each status of the hidden Markov model is described by a probability density function;

(d) adapt a probability density function by modifying the vocabulary, by splitting the probability density function into a first probability density function and into a second probability density function if a drop of an entropy value is below a predetermined threshold, wherein the adaptation is dynamically performed at run time; and (e) produce a recognized word sequence as a result of steps a–d.

* * * * *